United States Patent [19]
Simmons

[11] Patent Number: 5,522,571
[45] Date of Patent: Jun. 4, 1996

[54] PIPE HANGING STRAP

[75] Inventor: Lesley M. Simmons, Wimberely, Tex.

[73] Assignee: Hang It All Products, Woodland Hills, Calif.

[21] Appl. No.: 282,831

[22] Filed: Aug. 2, 1994

Related U.S. Application Data

[63] Continuation-in-part of Ser. No. 103,334, Aug. 9, 1993, abandoned.

[51] Int. Cl.$^6$ ........................................................ F16L 3/00
[52] U.S. Cl. ................................... 248/59; 248/60; 248/62
[58] Field of Search .................................. 248/59, 60, 62, 248/58, 55, 74.3; 24/20 EE, 20 R

[56] References Cited

U.S. PATENT DOCUMENTS

| | | | |
|---|---|---|---|
| Re. 33,639 | 7/1991 | Oetiker | 24/20 |
| 1,086,442 | 2/1914 | Cornelius . | |
| 1,294,951 | 2/1919 | Rohrbacher | 24/20 |
| 1,669,446 | 5/1928 | Bowers | 248/59 |
| 1,690,643 | 11/1928 | Lavender | 248/62 |
| 2,249,764 | 7/1941 | Hothersall | 24/20 |
| 2,304,973 | 12/1942 | Vicchiola | 248/58 |
| 2,310,622 | 2/1943 | Ellinwood | 248/62 |
| 2,373,833 | 4/1945 | Johnson | 248/74.3 |
| 2,542,172 | 2/1951 | Wold | 248/60 |
| 2,648,326 | 8/1953 | Eptstein | 126/317 |
| 2,896,887 | 7/1959 | Beltz | 248/58 |
| 3,965,938 | 6/1976 | Bauerele et al. | 248/60 |
| 5,115,541 | 5/1992 | Stichel | 24/20 |

Primary Examiner—Alvin C. Chin-Shue
Assistant Examiner—Korie H. Chan
Attorney, Agent, or Firm—Poms, Smith, Lande & Rose

[57] ABSTRACT

An apparatus for supporting conduit to a support structure. The apparatus includes a flexible band having a plurality of longitudinally spaced receiving apertures, a plurality of appendages arranged along the length of the band and a fastening system for fastening at least one end of the flexible band to the support structure. The free end of the flexible band may be wrapped around a conduit so that a receiving aperture can be interlocked with an appendage.

32 Claims, 3 Drawing Sheets

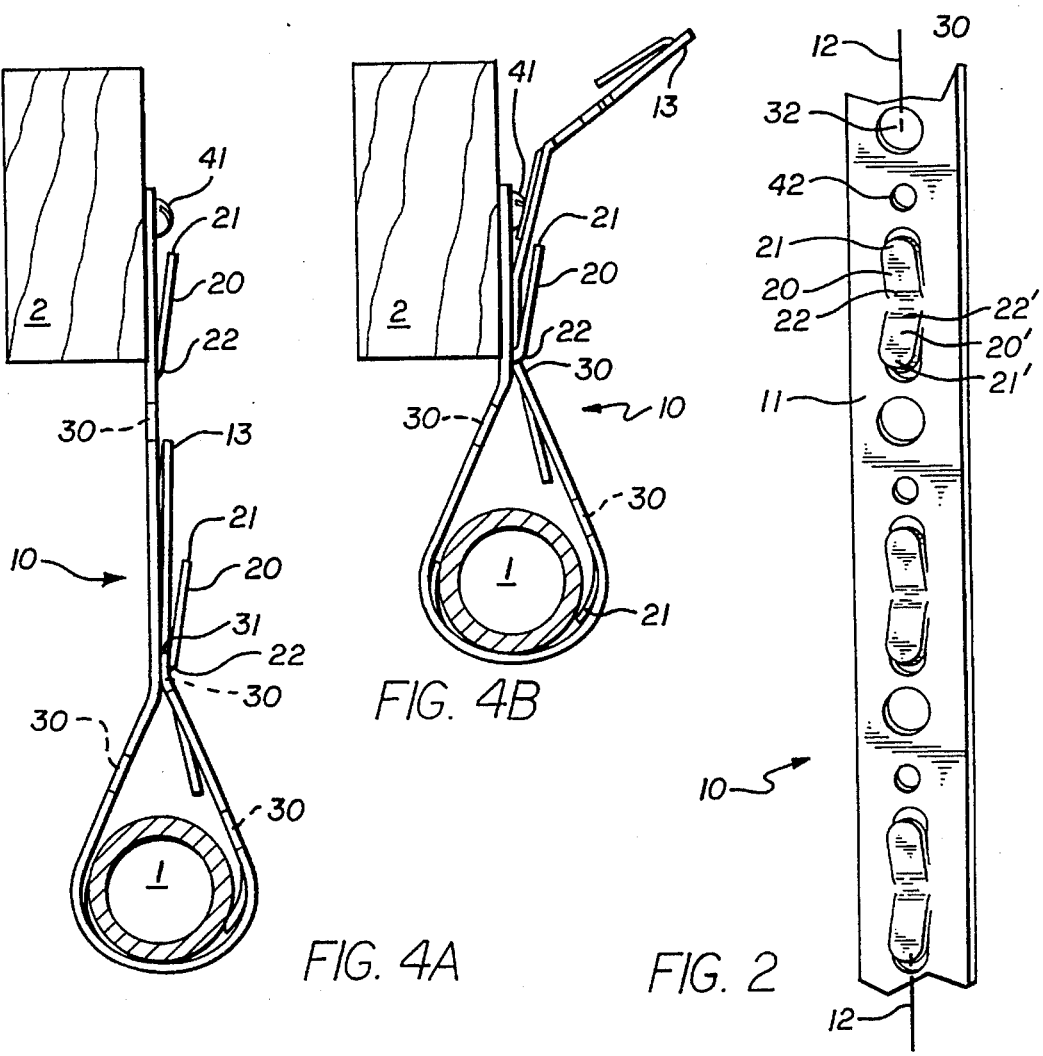

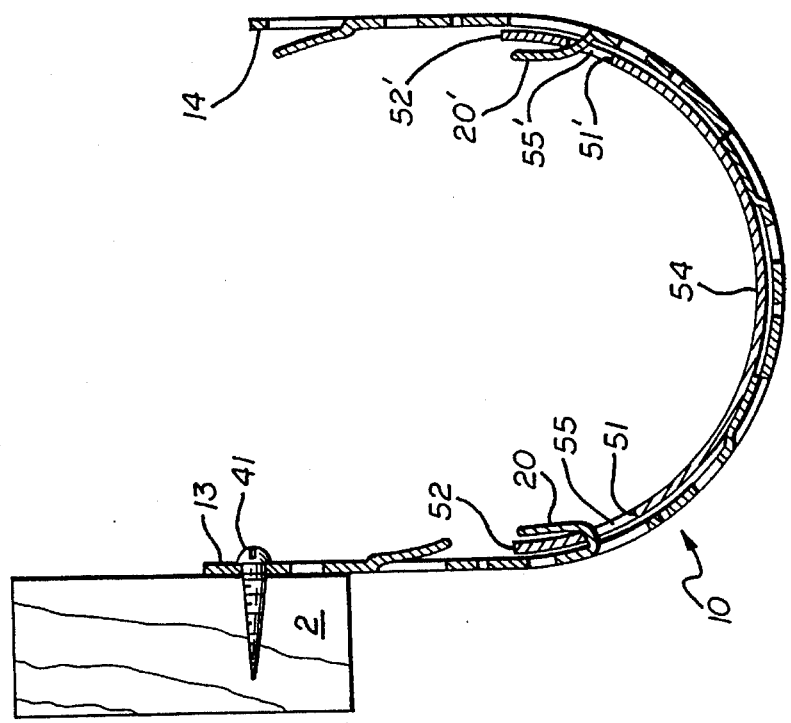
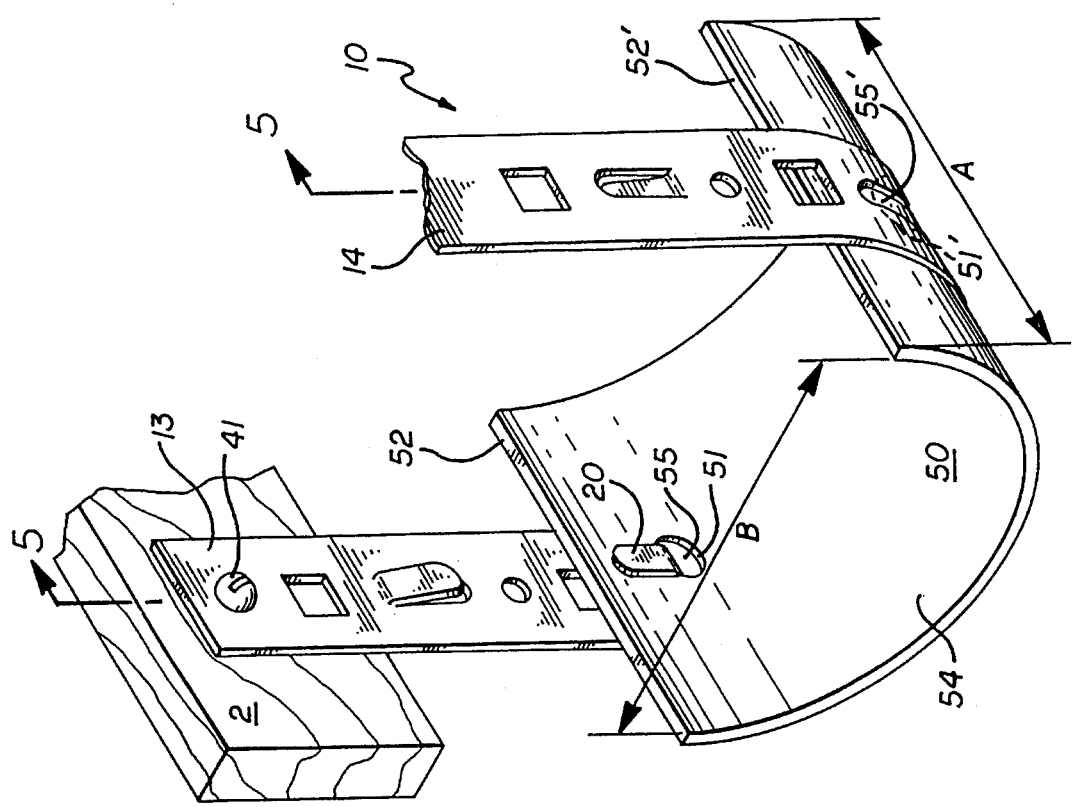
FIG. 5
FIG. 6

PIPE HANGING STRAP

The present application is a continuation-in-part of U.S. application Ser. No. 08/103,334, filed Aug. 9, 1993, now abandoned, the specification of which is incorporated herein by reference.

BACKGROUND OF THE INVENTION

1. Field of Invention

The present invention relates generally to pipe hanging straps, such as plumbers tape and pipe hangers and, more particularly, to pipe hanging straps having an improved construction for locking one portion of the strap to another portion of the strap to facilitate hanging pipe and other conduit from, or attaching pipe and other conduit to, building support structures.

2. Description of the Related Art

The use of pipe hanging straps to secure mechanical and electrical building components, such as plumbing pipes, conduit, and heating and air conditioning ducts, to building support structures or to suspend these components from building support structures is well-known. A strip or band of material, such as sheet metal, is attached at one end to a support member such as a beam, post, or wall stud. The other end of the band is wrapped around the pipe or conduit and attached in some manner to the first end, thereby forming a loop which supports the conduit.

U.S. Pat. No. 1,086,442, issued to L. A. Cornelius, discloses a pipe hanging strap manufactured in a long, continuous strap. The strap includes alternating narrow and wide portions along the length of the strap. The wide portions include an opening having narrow slits formed therein. The strap may be cut to a desired length and the severed end forms a connecting member which is inserted through one of the narrow slits and interlocks with the corresponding opening, thereby forming a loop for supporting a pipe or cable.

U.S. Pat. No. 2,304,973, issued to D. D. Vecchiola, discloses a pipe hanging strap having a series of slots along its length. The strap is provided with an adjustable loop at one end for receiving a pipe. A bendable tab at the end of the loop may be inserted through one of the slots and bent to secure the loop around the pipe.

U.S. Pat. No. 2,542,172, issued to E. A. Wold, discloses a bendable strap that is produced in a continuous length with apertures along its length. The strap is secured around a pipe by placing a clip around an overlapping portion of the strap or by inserting a pin or bolt through the holes of overlapping portions of the strap.

U.S. Pat. No. 2,648,326, issued to S. Epstein, discloses a pipe hanging strap of predetermined length that is secured around a pipe by inserting a tab provided at one end of the strap into a slot provided at the other end.

The aforementioned pipe hanging straps suffer from a number of deficiencies. For example, the Cornelius strap is difficult to use because it must be precisely cut so that a narrow portion remains at, its edge. Also, the cornelius edge must be carefully aligned with the narrow slit. The Vecchiola and Epstein straps can only be used with one diameter of pipe. As such, a variety of sizes must be supplied to a given job site. Finally, the Wold device requires the use of clips, pins or bolts which can be easily misplaced and which add additional steps to the pipe hanging process.

SUMMARY OF THE INVENTION

The general object of the present invention provide an improved pipe hanging strap which obviates, for practical purposes, the aforementioned problems in the art. In particular, one object of the present invention is to provide a pipe hanging strap that can be manufactured in a continuous length that is ready for use, rolled up for transport and storage and cut to a strip of any desired length.

Another object of the present invention is to provide a pipe hanging strap for securing plumbing pipes or other conduits of different diameters which may be adjusted and then locked into place.

A further object of the present invention is provide a pipe hanging strap for securing plumbing pipes and other conduit of varying diameter which may be easily wrapped around a conduit, adjusted, and secured into place with one hand and without the use of tools.

A still further object of the present invention is to provide a pipe hanging strap in which the means for adjusting and securing the strap around the conduit is contained in a one-piece strap without the need for additional components.

A still further object of the present invention is to provide a pipe hanging strap that is easy to manufacture and which utilizes available materials of reasonable cost.

In order to accomplish these and other objectives, the present invention includes an elongated band having along its length appendages and apertures for receiving the appendages. A length of the band may be wrapped around a plumbing pipe or other conduit. At least one the appendages may then be inserted into an aperture. The appendages, designed to mate with the apertures in the band, may be bent to remain secure within the apertures. The band is readily adjustable to provide a tighter or looser grip around the conduit by releasing the appendages from the apertures and inserting other appendages on the band into these apertures. The strap is attached to beams or other building support structures by driving a fastener, such as a nail or screw, through the band and into the support structure.

In accordance with one preferred embodiment, the appendages are flat tabs and the apertures are square holes aligned along the length of the band. The apertures may also be round holes.

In accordance with another preferred embodiment, pairs of tabs are arranged between consecutive apertures.

In accordance with still another preferred embodiment, the pairs of tabs are arranged between pairs of apertures.

The present invention may also include a sheet of material formed into the shape of an arc that acts as a cradle for supporting horizontal plumbing pipes and conduit. The sheet has opposed pairs of apertures for receiving the strap appendages. In one preferred embodiment, two pieces of strap are suspended from a building support structure, such as a beam, and are connected to the sheet by inserting appendages from the strap into the sheet apertures. In another preferred embodiment, one length of strap is wrapped underneath the sheet, connected to the sheet by inserting strap appendages into the sheet apertures, and supported from a building support structure at both ends of the strap.

The present invention provides a number of advantages over the prior art. For example, the present tab and aperture arrangement is easier to use than the aforementioned Cornelius strap because the strip does not have to be precisely cut. Also, the tab does not have to be precisely arranged relative to the aperture, as must be done with Cornelius' narrow slit arrangement. The present invention may be used with pipes and other conduit of varying size, as opposed to the Vecchiola and Epstein straps. The present invention does not require the use of clips, pins or bolts, as does the wold device. Finally, the cradle prevents the crushing of insulation which often covers pipes and ducts.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

FIG. 1 is a top view of one preferred embodiment of the preset invention.

FIG. 2 is a top view of another preferred embodiment of the present invention.

FIG. 3 is a side view of the preferred embodiment illustrated in FIG. 1.

FIGS. 4A and 4B are cross-sectional views showing one use of the invention.

FIG. 5 is a view showing another use of the invention.

FIG. 6 is a cross-sectional view of the invention depicted in FIG. 5.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention. The scope of the invention is defined by the appended claims.

Preferred embodiments of the present invention are illustrated in FIGS. 1–9, in which like numerals refer to like features of the invention.

Figure 7:
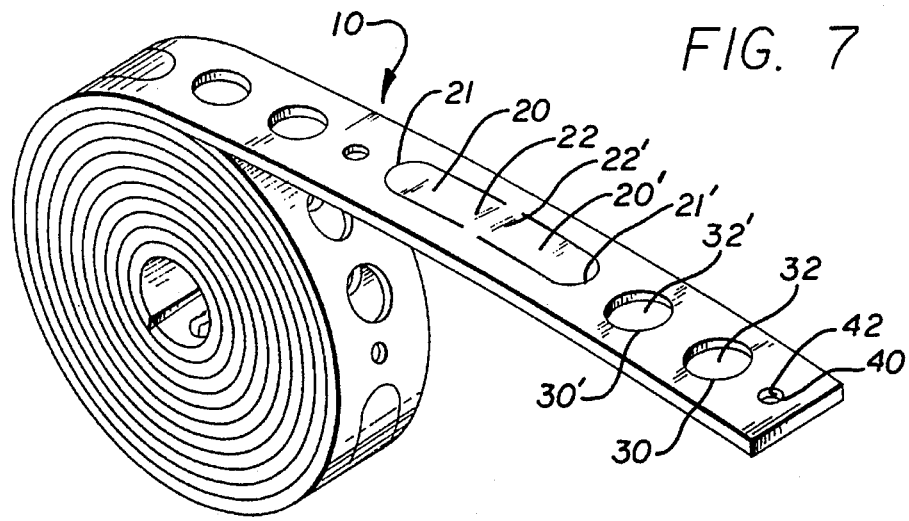
FIG. 7 illustrates one embodiment of the present invention stored in the form of a roll.

A top view of one example of a first preferred embodiment of a pipe hanging strap in accordance with the present invention is depicted in FIG. 1. The pipe hanging strap is formed out of sheet material, such as sheet metal, which consists of an elongated band 10 having parallel sides. Band 10 may be provided in any desired length and width, but preferably with a width of three-eighths inch to three inches in width, and most preferably with a width of three-quarters inch. Band 10 is of a thickness to provide sufficient material strength to support the weight of the plumbing pipe or other conduit segments, yet is sufficiently thin to permit band 10 to be easily bent into a circle. Band 10 is made of a material that does not crack or become brittle when bent, yet is rigid and has minimal elasticity. Preferably, band 10 is provided in a continuous length which may be rolled into a large roll for transport and storage. One example, of such a roll is illustrated in FIG. 7.

As illustrated for example in FIG. 1, band 10 has a plurality of flat tabs 20, which serve as the elongated attachment appendages, receiving apertures 30 and fastening apertures 40, all located longitudinally along the band in a repeating sequence. In accordance with the first preferred embodiment, one appendage, one receiving aperture and one fastening aperture are provided in sequence along the length of band 10. Appendage 20, receiving aperture 30 and fastening aperture 40 are all aligned longitudinally along center-line 12—12.

Referring to FIGS. 1 and 3, appendage 20 has an end 21 and a neck portion 22 connecting appendage 20 to band 10. Appendage 20 may be from one-half inch to one and one-half inches in length. Neck portion 22 forms an area for bending appendage 20 above band top surface In the preferred embodiment illustrated in FIG. 1, the center 32 of receiving aperture 30 is located on band 10 from one-quarter inch to one and one-half inches from the nearest adjacent appendage neck portion 22 and from one-quarter inch to one inch to the center 42 of the nearest adjacent fastening aperture 40, which is located on band 10 from one-quarter inch to one and one-half inch to the nearest adjacent appendage end 21.

In another preferred embodiment of the invention, an example of which is depicted in FIG. 2, two appendages, one receiving aperture and one fastening aperture are provided in sequence along the length of band 10 and aligned longitudinally along center-line 12—12. First appendage 20 and second appendage 20' are oriented inversely to each other such that first appendage end 21 of appendage 20 and second appendage end 21' of appendage 20' point in opposing directions. In accordance with the illustrated example, first appendage neck portion 22 appendage 20 and second appendage neck portion 22' of appendage 20' are disposed longitudinally adjacent from one-sixteenth inch to three-eighths inch apart. The center 32 of receiving aperture 30 is located on band 10 from one-quarter inch to one and one-half inches from the nearest adjacent first appendage end 21 and from one-quarter inch to one inch to the center 42 of the nearest adjacent fastening aperture 40, which is located on band 10 from one-quarter inch to one and one-half inches to the nearest adjacent second appendage end 21. This embodiment allows either appendage 20 or appendage 20' to be inserted into receiving aperture 30, thereby providing greater flexibility in securing band 10 around a plumbing pipe or other conduit. There will always be an upwardly facing tab after the strap is wrapped around the pipe or conduit, regardless of the initial orientation of the strap.

Appendage 20 may be cut from band 10 and lie flush with top surface 11. As such, the pipe hanging strap may be manufactured in a continuous roll containing several layers of bands each stacked tightly on top of another as shown by way of example in FIG. 7. Before the pipe hanging strap may be used, it may be necessary to push appendages 20 above band top surface 11.

Alternatively, appendage 20 may be stamped or punched into band 10 as shown in FIG. 3. Here, appendage 20 is raised above the top surface 11 of band 10 forming an angle from 5–25 degrees above top surface 11. As such, the pipe hanging strap may be used immediately without preliminary preparation of appendages 20.

Receiving aperture 30 must be of sufficient size to receive appendage end 21. Contact of appendage neck portion 22 against receiving aperture edge 31 helps secure appendage 20 in place. Side 31 of receiving aperture 30 (FIG. 1), is straight and perpendicular to the longitude of band 10 such that the force from the weight of the conduit being supported is evenly distributed along side 31 and keeps appendage end 21 from slipping out of receiving aperture 30. In the embodiment illustrated for example in FIG. 1, receiving aperture 30 is provided in the shape of a square. Receiving aperture 30 may be provided in other shapes such as a triangle, in which the apex is directed away from the nearest adjacent appendage, or a circle, as shown in FIG. 2.

A plurality of fastening apertures 40 are located along the length of band 10. Fastener 41, depicted in FIG. 4A as having a flat head at one end that is larger than the fastening aperture 40, is inserted into fastening aperture 40 and driven into structural member 2 to which the plumbing pipe or conduit is to be supported or from which it is to be suspended. Fastener 41 may be a nail, bolt, screw or other similar device.

One exemplary use of the invention is depicted in FIGS. 4A and 4B. Referring to FIG. 4A, band 10 is wrapped around adjacent plumbing pipe 1 by bending band 10 upon itself to form a loop. Depending upon conditions, such as the weight of the conduit being supported and the strength of the appendages, it may be preferable to insert two or more appendage ends 21 into respective receiving apertures 30. Band 10 is easily adjustable around plumbing pipe 1 by grasping band end 13, removing appendage 20 from receiving aperture 30, raising or lowering band end 13 and, as shown in FIG. 4B, inserting appendage end 21 into receiving aperture 30. Appendage end 21 is then bent against top, surface 11 to produce a secure hold around the pipe or conduit. Band 10 is affixed to structural member 2 by driving fastener 41 through fastening aperture 40 and into structural member 2.

Another exemplary use of the invention is depicted in FIGS. 5 and 6. Band 10 supports saddle 50 which, in turn, is used to support horizontal ducting, conduit and the like. Saddle 50 may be a square, a rectangle, a circle, or an oval sheet from 8–14 inches in length along dimension A. Saddle 50 is shaped into an arc to receive conduit along its length. Saddle 50 preferably has a lateral dimension B of at least one-half the diameter of the conduit to be supported. A plurality of laterally opposed pairs of engaging apertures 51 are located along the lateral width of saddle 50 to receive appendages 20. In accordance with the exemplary embodiment, the center 55 of each engaging aperture 51 is positioned from one-quarter inch to two inches from saddle side 52 and the center 55' of second engaging aperture 51' is from one-quarter inch to two inches from saddle side 52'. Each pair of engaging apertures is aligned along line 5—5.

One length of band 10 may be suspended from structural member 2 at ends 13 and 14 to form a loop within which saddle 50 is held. Appendages 20 are inserted into engaging apertures 51 and 51' and may or may not be bent against saddle top 54. Ducting or conduit is placed on top of saddle 50 and is thereby supported.

Alternatively, two pieces of band ends 13 and 14 may be suspended from structural member 2 and are provided on opposite sides of saddle 50. Appendage 20 from band end 13 is inserted into engaging aperture 51. Appendage 20 from band end 14 is inserted into engaging aperture 51'. Appendages 20 are bent against saddle top 54 to hold saddle 50 in place.

Figure 8:
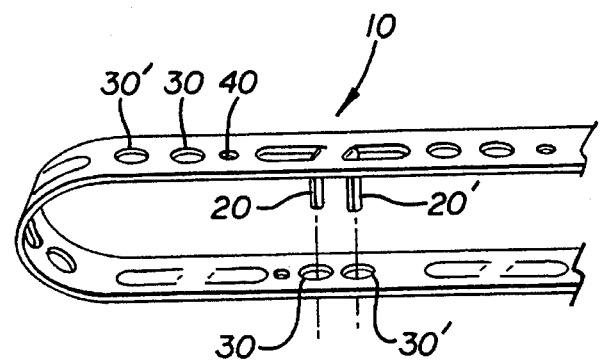
FIG. 8 is a perspective view in accordance with another preferred embodiment of the present invention.
Figure 9:
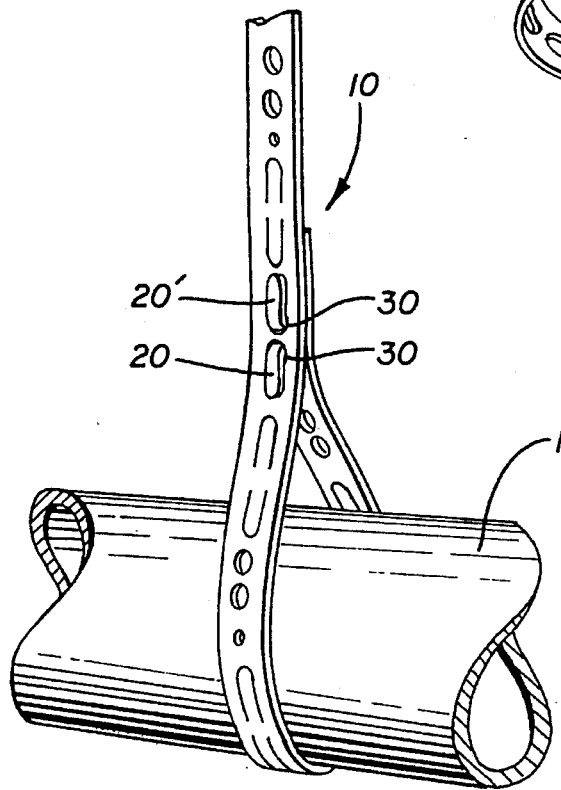
FIG. 9 is a perspective view showing a use of the invention depicted in FIG. 8.

As illustrated for example in FIGS. 7, 8 and 9, a further embodiment of the present invention includes two appendages, two receiving apertures and one fastening aperture provided in sequence along the length of band First appendage 20 and second appendage 20' are oriented inversely to each in a manner similar to that shown in FIG. 2. Preferably, first appendage neck portion 22 of appendage 20 and second appendage neck portion 22' of appendage 20' are approximately one-half inch apart. The centers 32 and 32' of receiving aperture 30 and 30' are also approximately one-half inch apart. The mid point between adjacent aperture is one and one-half inches from the mid point between adjacent appendages 20 and 20'. The center 42 of fastening aperture 40 is located approximately midway between appendage end 21 and receiving aperture 30. This embodiment advantageously allows a pair of adjacent appendages (20 and 20') to be inserted into a respective pair of receiving apertures (30 and 30'), thereby preventing upward and downward movement of band 10 and "locking" the band around a plumbing pipe or other conduit.

Although the present invention has been described in terms of the preferred embodiment above, numerous modifications and/or additions to the above-described preferred embodiments would be readily apparent to one skilled in the art. For example, the dimensions and materials described with respect to illustrated embodiments may be modified in order to adapt the invention to particular uses. It is intended that the scope of the present invention extends to all such modifications and/or additions and that the scope of the present invention is limited solely by the claims set forth below.

I claim:

1. An apparatus for supporting conduit to a support structure, comprising:

a flexible band defining a length, a first side and a second side, the flexible band including a plurality of longitudinally spaced receiving apertures extending through the first and second sides;

a plurality of longitudinally spaced appendages arranged along the first side of the flexible band, the appendages being adapted to extend outwardly from the first side such that a portion of at least one of the a appendage defines an angle substantially greater than zero with the side; and fastening means for fastening the flexible band to the support structure.

2. An apparatus as claimed in claim 1, wherein the fastening means comprises at least one fastening aperture formed in the flexible band.

3. An apparatus as claimed in claim 1, wherein the fastening means comprises a plurality of fastening apertures longitudinally spaced along the flexible band.

4. An apparatus as claimed in claim 2, wherein one of the receiving apertures and the at least one fastening aperture are arranged between adjacent appendages.

5. An apparatus as claimed in claim 2, wherein the fastening means further comprises a fastener adapted to be inserted through the fastening aperture and into the support structure.

6. An apparatus as claimed in claim 2, wherein the receiving apertures and the at least one fastening aperture each have a midpoint and each define respective maximum dimensions in a direction perpendicular to the length of the flexible band measured at the respective midpoints, the receiving aperture maximum dimension being substantially greater than the fastening aperture maximum dimension.

7. An apparatus as claimed in claim 1, wherein each of the appendages is arranged on the flexible band such that the appendage and the flexible band define an acute angle therebetween.

8. An apparatus as claimed in claim 1, further comprising a saddle having a plurality of saddle apertures, each of the saddle apertures being adapted to receive one of the appendages on the flexible band.

9. An apparatus as claimed in claim 1, wherein each of the receiving apertures is adapted to be engaged by only one of the appendages.

10. An apparatus for supporting conduit to a support structure, comprising:
  a flexible band defining a length, a first side and a second side, the flexible band including a plurality of longitudinally spaced receiving apertures extending through the first and second sides; and
  a plurality of appendage pairs arranged along the time side of the flexible band, the appendages being adapted to extend outwardly from the first side such that a portion of at least one of the appendages in at least one of the pairs defines an angle substantially greater than zero with the first side, each appendage pair being composed of a first appendage having an end attached to the flexible band and a free end and a second appendage having an end attached to the flexible band and a free end, the free ends of the first and second appendages adapted to be received by the receiving apertures in a locking relationship where the first and second a appendages face in substantially opposite directions.

11. An apparatus as claimed in claim 10, further comprising fastening means for fastening the flexible band to the support structure.

12. An apparatus as claimed in claim 11, wherein the fastening means comprises a plurality of longitudinally spaced fastening apertures formed in the flexible band and a fastener adapted to be inserted through one of the fastening apertures and into the support structure.

13. An apparatus as claimed in claim 12, wherein the receiving apertures and fastening apertures each have a midpoint and each define respective maximum dimensions in a direction perpendicular to the length of the flexible band measured at the respective midpoints, the receiving aperture maximum dimension being substantially greater than the fastening aperture maximum dimension.

14. An apparatus as claimed in claim 12, wherein at least one receiving aperture and at least one fastening aperture are arranged between adjacent appendage pairs.

15. An apparatus as claimed in claim 10, further comprising a saddle having a plurality of saddle apertures, each of the saddle apertures being adapted to receive one of the appendages on the flexible band.

16. An apparatus as claimed in claim 10, wherein the plurality of longitudinally spaced receiving apertures is composed of a plurality of receiving aperture pairs, each receiving aperture pair located substantially between two appendage pairs.

17. An apparatus as claimed in claim 16, further comprising fastening means for fastening the flexible band to the support structure.

18. An apparatus as claimed in claim 17, wherein the fastening means comprises a plurality of longitudinally spaced fastening apertures formed in the flexible band and a fastener adapted to be inserted through one of the fastening apertures and into the support structure.

19. An apparatus as claimed in claim 18, wherein each fastening aperture is formed substantially between an appendage pair and an adjacent receiving aperture pair.

20. An apparatus as claimed in claim 10, wherein each of the receiving apertures is adapted to be engaged by only one of the appendages.

21. An apparatus for supporting conduit to a support structure, comprising:
  a flexible band arranged in the form of a roll and defining a first side, a second side and a plurality of longitudinally spaced receiving apertures extending through the first and second sides, the flexible band defining a length sufficient to allow the flexible band to be cut into a plurality of smaller bands, each of the smaller bands defining a length sufficient to support a conduit to a support structure; and
  a plurality of appendage pairs arranged along the first side of the flexible band, the appendages being adapted to extend outwardly from the first side such that a portion of at least one of the appendages in at least one of the pairs defines an angle substantially greater than zero with the first side, each appendage pair being composed of a first appendage having an end attached to the flexible band and a free end and a second appendage having an end attached to the flexible band and a free end, the free ends of the first and second appendages adapted to be received by the receiving apertures in a locking relationship where the first and second appendages face in substantially opposite directions.

22. An apparatus as claimed in claim 21, wherein each of the receiving apertures is adapted to be engaged by only one of the appendages.

23. An assembly, comprising:
  a support structure;
  a conduit; and
  a flexible band defining a first side, a second side and a plurality of longitudinally spaced receiving apertures extending through the first and sides, the flexible band including a plurality of longitudinally spaced appendages adapted to extend outwardly from the first side such that a portion of at least one of the appendages defines an angle substantially greater than zero with the first side, wherein a first portion of the flexible band is fastened to the support structure and extends downwardly therefrom, a second portion of the flexible band is positioned under the conduit and extends upwardly therefrom, and one of the receiving apertures associated with the second portion is secured on one of the appendages associated with the first portion.

24. An apparatus as claimed in claim 20, wherein each of the receiving apertures is adapted to be engaged by only one of the appendages.

25. An apparatus for supporting conduit to a support structure, comprising:
  a flexible band defining a length and having a pair of opposed longitudinal ends, a main portion between the opposed longitudinal ends, and a plurality of longitudinally spaced receiving apertures;
  a plurality of appendages arranged along the main portion of the flexible band; and
  fastening means for fastening the flexible band to the support structure;
  wherein one of the receiving apertures is engaged and vertically supported by one of the appendages arranged along the main body of the flexible band when conduit is being supported.

26. An apparatus as claimed in claim 25, wherein each of the receiving apertures is adapted to be engaged by only one of the appendages.

27. An apparatus for supporting conduit to a support structure, comprising:
  a flexible band defining a length and laterally opposed side potions, the flexible band further defining a plurality of longitudinally spaced receiving apertures;
  a plurality of appendages arranged along the length of the flexible band, each of the appendages being entirely between the side portions and each of the appendages being on a respective line that extends between the side portions in a direction substantially perpendicular to the side portions and intersects the side portions; and fastening means for fastening the flexible band to the support structure.

28. An apparatus as claimed in claim 27, wherein each of the receiving apertures is adapted to be engaged by only one of the appendages.

29. An apparatus for supporting conduit to a support structure, comprising:

a flexible band defining a length and laterally opposed side portions, each of the side portions defining a continuous straight line along approximately the entire length of the band and being substantially parallel to one another, the flexible band further defining a plurality of longitudinally spaced receiving apertures;

a plurality of appendages arranged along approximately the entire length of the flexible band; and fastening means for fastening the flexible band to the support structure.

30. An apparatus as claimed in claim 29, wherein each of the receiving apertures is adapted to be engaged by only one of the appendages.

31. An apparatus for supporting conduit to a support structure, comprising:

a flexible band defining a length and a plurality of longitudinally spaced receiving apertures;

a plurality of appendages arranged along the length of the flexible band, each appendage having a neck portion integral with the flexible band and extending in a direction substantially perpendicular to the length of the band; and fastening means for fastening the flexible band to the support structure.

32. An apparatus as claimed in claim 31, wherein each of the receiving apertures is adapted to be engaged by only one of the appendages.

\* \* \* \* \*